US010471380B2

(12) United States Patent
Priske (10) Patent No.: US 10,471,380 B2
(45) Date of Patent: Nov. 12, 2019

(54) PROCESS FOR SEPARATION OF GASES WITH REDUCED MAINTENANCE COSTS

(71) Applicant: Evonik Fibres GmbH, Schoerfling am Attersee (AT)

(72) Inventor: Markus Priske, Salzburg (AT)

(73) Assignee: Evonik Fibres GmbH, Schoerfling am Attersee (AU)

( * ) Notice: Subject to any disclaimer, the term of this patent is extended or adjusted under 35 U.S.C. 154(b) by 194 days.

(21) Appl. No.: 15/540,709

(22) PCT Filed: Dec. 22, 2015

(86) PCT No.: PCT/EP2015/080925
§ 371 (c)(1),
(2) Date: Jun. 29, 2017

(87) PCT Pub. No.: WO2016/107786
PCT Pub. Date: Jul. 7, 2016

(65) Prior Publication Data
US 2017/0368497 A1 Dec. 28, 2017

(30) Foreign Application Priority Data
Dec. 29, 2014 (EP) .................... 14200384

(51) Int. Cl.
*B01D 53/22* (2006.01)
*B01D 69/08* (2006.01)
*B01D 71/64* (2006.01)

(52) U.S. Cl.
CPC ......... *B01D 53/226* (2013.01); *B01D 53/225* (2013.01); *B01D 53/228* (2013.01); *B01D 69/08* (2013.01); *B01D 71/64* (2013.01); *B01D 53/227* (2013.01); *B01D 2053/224* (2013.01); *B01D 2317/022* (2013.01); *B01D 2317/025* (2013.01)

(58) Field of Classification Search
CPC .... B01D 53/22; B01D 53/225; B01D 53/226; B01D 53/227; B01D 53/228; B01D 69/08; B01D 71/64; B01D 2317/022; B01D 2317/025
See application file for complete search history.

(56) References Cited

U.S. PATENT DOCUMENTS

| | | | |
|---|---|---|---|
| 5,709,732 A * | 1/1998 | Prasad | B01D 53/226 95/45 |
| 6,168,649 B1 | 1/2001 | Jensvold et al. | |
| 6,565,626 B1 * | 5/2003 | Baker | B01D 53/226 95/47 |

(Continued)

FOREIGN PATENT DOCUMENTS

| EP | 0 799 634 A1 | 10/1997 |
|---|---|---|
| EP | 2 735 355 A1 | 5/2014 |

(Continued)

OTHER PUBLICATIONS

International Search Report and Written Opinion of the International Searching Authority dated Apr. 26, 2016 in PCT/EP2015/080925 filed Dec. 22, 2015.

*Primary Examiner* — Jason M Greene
(74) *Attorney, Agent, or Firm* — Oblon, McClelland, Maier & Neustadt, L.L.P.

(57) ABSTRACT

The invention relates to a specific process and apparatus for separation of gas mixtures with reduced maintenance costs.

23 Claims, 1 Drawing Sheet

Illustrative connection arrangement of several membrane modules according to invention (56) References Cited

U.S. PATENT DOCUMENTS

| | | | |
|---|---|---|---|
| 8,999,038 B2 | 4/2015 | Ungerank et al. | |
| 2013/0098242 A1* | 4/2013 | Ungerank | B01D 53/226 95/51 |
| 2015/0273388 A1* | 10/2015 | Fukuda | B01D 53/226 95/45 |
| 2015/0336046 A1 | 11/2015 | Ungerank et al. | |

FOREIGN PATENT DOCUMENTS

| | | |
|---|---|---|
| JP | 2009-242773 A | 10/2009 |
| WO | WO 00/33949 A1 | 6/2000 |
| WO | WO 2012/000727 A1 | 1/2012 |
| WO | WO 2014/075850 A1 | 5/2014 |
| WO | WO 2014/183977 A1 | 11/2014 |

* cited by examiner

Illustrative connection arrangement of several membrane modules according to invention

PROCESS FOR SEPARATION OF GASES WITH REDUCED MAINTENANCE COSTS

The invention relates to a specific process and apparatus for separation of gas mixtures with reduced maintenance costs.

It is generally known that gas mixtures can be separated by means of gas separation membranes because of different permeabilities of the individual gases. In one way, to produce such gas separation membranes, polymers are processed to give hollow fibers or flat membranes. The membranes are characterized by a very thin separation layer so that the permeance of the membrane is as large as possible.

As well as new membrane materials, different ways of connecting membranes have also been investigated in the prior art. A series of single-stage or multi-stage membrane interconnections for separating gases are known in the literature. By way of example, mention may be made here as literature sources of: Baker, IndEngChemRes, Natural Gas Processing with Membranes, 47 (2008); Bhide MemSci, Hybrid processes for the removal of acid gases from natural gas, 1998; Hhenar, MemSci Application of Cardo-type polyimide (PI) and polyphenylene oxide (PPO) hollow, 2008; EP 0 603 798; EP 0 695 574; U.S. Pat. No. 5,753,011; EP 1 634 946; EP 0 596 268; U.S. Pat. No. 6,565,626 B1; U.S. Pat. No. 6,168,649 B1 and EP 0 799 634. The specified methods have the disadvantage that they in part include a plurality of recompression steps or that either only a high purity of the permeate gas or only a high purity of the retentate gas can be achieved.

WO 2012/00727; WO 2013/098024; WO 2014/075850; KR10-1327337; KR10-1327338; U.S. pat. No. 6,565,626 B1; U.S. Pat. No. 6,168,649 B1; JP 2009-242773 A; each disclose membrane separation processes with three membrane separation stages, wherein a retentate stream from stage 3 and a permeate stream from stages 2 are recycled to the crude gas stream. WO 2012/00727; WO 2013/098024 and WO 2014/075850 represent the most optimized of all of these processes. In said patents an apparatus and a process are described which are optimized in view of product purity in combination with the lowest energy consumption. In other words, these processes provide two high pure product streams in an energy optimized way.

In recent times, however, a new problem has occurred, that is not solved in a sufficient manner by the apparatuses and processes of the prior art. The problem is that some gas separation plants are operated at sites where energy is very cheap. At such locations the focus of operators of separation plants lies on investment and maintenance costs rather than on an energy saving. No sufficient solution for this problem has been found in the prior art.

It was thus, an object of the present invention to provide apparatuses and processes for separation and purification of gas mixtures, which have the disadvantages of the prior art only to a reduced degree, if at all.

More particularly, processes and apparatuses, which are able to afford both, permeate gas and retentate gases are to be provided in high purities.

In a further specific object, these processes and apparatuses are to be advantageous in terms of costs, in particular of maintenance costs. Especially the costs for expendable materials like the membranes should be as low as possible.

In a next specific object, a process/apparatus usable with maximum universality is to be provided for any desired gas mixtures. More particularly, it should be possible to separate gas streams which are obtained in the production of biogas and natural gas, or which comprise carbon dioxide and methane in the presence of other gases such as water, hydrogen, hydrogen sulfide.

It was a further specific object of the present invention to provide a process or an apparatus, which enables purification of methane-containing crude gas streams, with reduced methane emission compared to the prior, art processes at the same throughput, and hence reduced environment pollution by this strong greenhouse gas.

Further objects, which are not stated explicitly, are evident from the overall context of the claims, description, examples and figures, which follow.

It has now surprisingly been found that the inventive process described herein and the inventive apparatus described herein can afford pure streams of permeate and retentate without requiring more than one compressor respectively without further purification of the permeate or retentate stream by other methods. The inventive apparatus thus enables simultaneous achievement of permeate and retentate streams in high purity. As shown in the examples, the new process, compared to the prior art processes, in particular WO 2012/00727, can be operated with a significantly reduced overall membrane capacity to obtain similar purification results. Thus, the costs for the membranes, which are expendable goods and have to be exchanged time by time, were reduced significantly.

The inventors of the present invention surprisingly found, that beside of the energy optimum, as disclosed in WO 2012/00727, a maintenance cost optimum for three-stage membrane separation exists. This can be reached by
- increasing the total gas volume recycled in sum with the second permeate stream (9) and the third retentate stream (10), in combination with
- an increase of the total membrane capacity of the retentate separation stage (2) compared to the total membrane capacities of separation stage (1) and preferably also of stage (3), and
- a specific quotient of the pressure ratios of the permeate separation stage (3) over the feed stream separation stage (1).

The examples below show the invest and maintenance cost improvement over WO 2012/00727.

The inventors further found out, that the inventive processes and apparatuses could produce high purity products even with membranes with a lower selectivity. The energy-optimized process of WO 2012/00727 requires higher selective membranes, which are more expensive.

The present invention therefore provides a process and an apparatus as claimed, and as defined in detail in the description, examples and FIG. 1 below.

Before describing the present invention in detail hereinafter, some important terms are defined.

Membrane capacity as used in the present invention is defined as the product of the membrane surface and the permeance of the membrane at operating temperature that is determined for nitrogen (Grade 4.8) under standard conditions. Standard conditions are described in detail in section measurement methods below. Membrane surface respectively membrane area is the external surface of the membrane as macroscopically visible. For its determination it is assumed that the membrane does not have pores and the external surface is homogeneous and smooth. In other words, the membrane surface of a flat membrane calculates as the product of length and width of the flat sheet and the membrane surface of hollow fiber membranes calculates as the product of length and external circumference of the hollow fiber.

If membranes of identical materials are operated in different separation stages and if the operating temperature is identical, their permeance is identical. As consequence, the ratio of membrane capacities used in two separation stages correlates to the ratio of the membrane surfaces. If, however, membranes out of different materials are used in different stages and/or if different membranes are used in one stage and/or if different temperatures are used in different stages, the ratio of the capacities is usually different to the ratio of the membrane surfaces. Since such "mixed systems" are covered by the present invention, too, the "membrane capacity" is used as distinguishing feature instead of the "membrane surface".

It is also possible in the present invention to use more than one membrane in a separation stage. Thus, the total membrane capacity per stage has to be calculated, which is the sum of all individual membrane capacities used in that stage.

Permeance is defined as material flow per time unit, area and differential pressure through a membrane. Permeability on the other hand is defined as material flow per time unit, area, differential pressure and layer thickness through a membrane.

The term selectivity as used and claimed in the present invention to characterize membranes, in each case is the pure gas selectivity, independent whether membranes are used to separate a two or a multigas mixture. The selectivity for hollow fiber membranes calculates as quotient of the permeances of two pure gases, and thus states how well the membrane can separate a gas mixture with regard to the two components. For flat sheet membranes, the selectivity is calculated using the permeabilities of two pure gases instead of the permeances.

Permeate refers to the overall stream obtained on the low-pressure side of the membrane, membrane module or membrane separation step. Permeate gas refers in each case to the component(s) enriched in the permeate stream relative to the respective feed stream at the membrane, at the membrane module or in the membrane separation step.

Retentate refers to the entire stream that is obtained on the high-pressure side of the membrane, membrane modules or membrane separation step, and that does not pass through the membrane. Retentate gas refers to the component(s) enriched in each case in the retentate stream relative to the respective feed stream at the membrane, at the membrane module or in the membrane separation step.

Crude gas or crude gas mixture or crude gas stream (17) refer to a gas mixture of two or more gases respectively to a stream of this gas mixture which are to be separated using the method of the present invention and/or the apparatus of the present invention. The terms "crude gas" and "raw gas" are used synonymously in the present invention.

Feed stream (5) refers to a gas stream that is supplied to the feed stream separation stage (1). This stream can correspond to raw gas stream (17), respectively to the raw gas stream (17) compressed by a compressor (4), at the start of operation of the process or apparatus of the present invention. Sometimes the raw gas comes from a sources that already has a pressure sufficient to generate the required driving force over the membranes without additional compression or otherwise generation of additional driving force, for example a vacuum device on a permeate side of a membrane separation stage or with a flushing-gas stream. In the most cases, however, the processes and apparatuses of the present invention are configured such, that a compressor, upstream of the feed stream separation stage (1) and/or at least one vacuum device in at least one of the permeate stream, are used or generate the driving force.

After recycling of the second permeate stream (9) and/or of the third retentate stream (10), the feed stream (5) is composed of the gases of the crude gas stream (17), of the second permeate stream (9) and of the third retentate stream (10). In this case, the feed stream (5) can be produced either by mixing streams (9) and/or (10) with the uncompressed crude gas stream (17), or mixing either or both with the compressed crude gas stream (17) or mixing one with the uncompressed crude gas stream (17) and one with the compressed crude gas stream (17), or by mixing streams (9) and/or (10) with the crude gas stream (17) within the compressor. Combinations and not explicitly described alternatives for mixing procedures described above are also encompassed by the present invention.

Feed stream separation stage (1) refers to a membrane separation stage for separation of the feed stream (5) into a first permeate stream (6) and a first retentate stream (7).

Retentate separation stage (2) refers to a membrane separation stage, which may be of identical or different construction to the feed stream separation stage (1), for separation of the first retentate stream (7) into a second permeate stream (9) and a second retentate stream (8).

Permeate separation stage (3) refers to a membrane separation stage, which may be of identical or different construction to the feed stream separation stage (1) and/or the retentate separation stage (2), for separation of the first permeate stream (6) into a third permeate stream (11) and a third retentate stream (10).

The herein below described preferred and specific embodiments of the method according to the present invention and also the preferred and particularly suitable designs and also the drawings and descriptions of drawings will now be used to provide a merely illustrative further elucidation of the invention; that is, the invention is not limited to these exemplary embodiments and uses or to the particular combinations of features within individual exemplary embodiments.

Individual features indicated and/or depicted in connection with concrete exemplary embodiments are not restricted to these exemplary embodiments or to the combination with the other features of these exemplary embodiments, but can be combined where technically possible with any other versions even though these are not separately discussed in the present document.

Identical reference signs in the individual figures and illustrations of the drawings designate identical or similar components or components acting in an identical or similar manner. The depictions in the drawing also illustrate those features without reference signs, irrespective of whether such features are subsequently described or not. On the other hand, features, which are included in the present description but are not visible or depicted in the drawings, are also readily apparent to a person skilled in the art.

Figure 1:
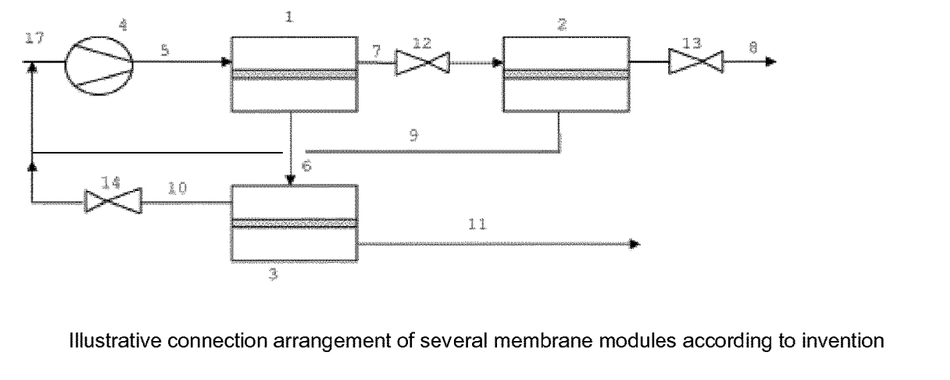
FIG. 1: Illustrative connection arrangement of several membrane modules according to invention

The method of the invention is a method for separating gases, which is carried out in an apparatus, which is also part of the invention, which comprises:
 a feed stream separation stage (1), a retentate separation stage (2) and a permeate separation stage (3), and
 optionally a compressor (4) arranged up-stream of the feed stream separation stage and/or at least one vacuum device, preferably a vacuum pump or blower, (15), which is not shown in the Figures, arranged in at least one permeate stream of the feed stream separation stage, the retentate separation stage and/or the permeate separation stage. The question whether a compressor or a vacuum device is required may depend on the pressure of the source for the raw gas. If its pressure is already high enough, to ensure a sufficient driving force, i.e. partial pressure difference, over the membranes, no additional driving force generating device is necessary. In the process of the present invention a flushing-gas stream, preferably a permeate-side flushing-gas stream, may also be used alone or in combination with the other devices to generate the necessary partial pressure difference.

The feed stream separation stage (1) separates a feed stream (5) comprising at least two components into a first permeate stream (6) and a first retentate stream (7). The retentate separation stage (2) separates the first retentate stream (7) into a second permeate stream (9) and a second retentate stream (8), and the permeate separation stage (3) separates the first permeate stream (6) into a third retentate stream (10) and a third permeate stream (11).

The process and the apparatus of the present invention are configured such, that the second retentate stream (8) may be removed as a first product or may be further processed. It is also possible to discard the second retentate stream (8) but only if the third permeate stream (11) is withdrawn as product or further processed. Analogously the third permeate stream (11) may be removed as second product or may be further processed. The third permeate stream (11), however, may also be discarded, but only in cases where the second retentate stream (8) is the desired product, which is withdrawn or further processed.

The apparatus and the process of the present invention are characterized as follows: the second permeate stream (9) and the third retentate stream (10) are fed to the feed stream (5),
  the first permeate stream (6) is preferably not subjected to a recompression,
  the feed stream separation stage (1), the retentate separation stage (2) and the permeate separation stage (2) are membrane separation stages,
  the process and the apparatus are configured such that the gas volume recycled in the second permeate stream (9) and in the third retentate (10) stream in sum totals 60 to 200% by volume of the crude gas stream (17),
  the process and the apparatus are configured such that the membrane capacity, measured for nitrogen Grade 4.8 under standard conditions as defined in the measurement method section below, used in the retentate separation stage (2) in total is higher than the total membrane capacity, measured for nitrogen Grade 4.8 under standard conditions as defined in the measurement method section below, used in the feed stream separation stage (1), and
  the process and the apparatus are configured such, that the quotient of the pressure ratio over the permeate separation stage (3) to the pressure ratio of the feed stream separation stage (1) is in a range of from 0.5 to 8.

In this context pressure ratio over the permeate separation stage (3) is defined as gas pressure on the retentate side divided through the gas pressure at the permeate outlet opening of the permeate separation stage (3). Pressure ratio over the feed stream separation (1) is defined as gas pressure on the retentate side divided through the gas at the permeate outlet opening of the feed stream separation stage (1).

The process and the apparatus of the invention allow to produce simultaneously retentate gas and a permeate gas streams, with high purity. It, however, also provides the flexibility to isolate only one gas stream with high purity, if desired. Compared to the best prior art process according to WO 2012/000727, however, the process of the present invention allows to reduce the membrane capacities, required in sum for all separation stages in the process. Thus, the investment costs and in particular the maintenance costs can be reduced significantly.

It has to be acknowledged, that the achieved reduction of the total membrane capacities is encompassed by an increased volume of the gas recycled in streams (9) and (10), which increases the operating costs. The process and the apparatus of the present invention are thus especially designed for plant sites, where energy, i.e. the operating costs, is very cheap and where the invest costs and the maintenance costs are the critical issue.

As mentioned before, the process and the apparatus of the present invention are configured such, that a special recycling rate of streams (9) and (10) is applied. To limit above described increase in the operating costs, the gas volume recycled in the second permeate stream (9) and in the third retentate stream (10), preferably totals 61 to 180% by volume of the crude gas stream (17), particular preferred 61 to 150% by volume, especially preferred 62 to 100% by volume, even more preferred 63 to 85% by volume and most preferred 65 to 85% by volume.

For the present invention it is important that a special recycling rate is applied in combination with a total membrane capacity in the retentate separation stage (2), that is higher than that of the feet stream separation stage (1), respectively preferably also higher than that of the permeate separation stage (3). This is in contrast to WO 2012/000727, where all separation stages have identical membrane capacities. It is preferred that the ratio of the total capacity, measured for nitrogen Grade 4.8 under standard conditions as defined in the description, of the membranes used in the retentate separation stage (2) to the total capacity, measured for nitrogen Grade 4.8 under standard conditions as defined in the description, of the membranes used in the feed stream separation stage (1) is in a range of from 1.05 to 10, particular preferred of from 1.1 to 8, more preferred of from 1.2 and 7 and most preferred of from 1.5 to 6.

It is further preferred, if the ratio of the total capacity, measured for nitrogen Grade 4.8 under standard conditions as defined in the description, of the membranes used in the retentate separation stage (2) to the total capacity, measured for nitrogen Grade 4.8 under standard conditions as defined in the description, of the membranes used in the permeate separation stage (3), is also in a range of from 1.05 to 10, particular preferred of from 1.1 to 8, more preferred of from 1.2 and 7 and most preferred of from 1.5 to 6.

It is in addition preferred that the feed stream separation stage (1) and the permeate separation stage (3) have total membrane capacities, in each case, measured for nitrogen Grade 4.8 under standard conditions as defined in the measurement method section below, that do not differ too much. Preferably the quotient of the total capacity of the membranes used in the permeate separation stage (3) to the total capacity of the membranes used in the feed stream separation stage (1) is in a range of from 0.5 to 3, particular preferred of from 0.6 to 2, especially preferred of from 0.7 and 1.8, more preferred of from 0.8 to 1.2 and most preferred of from 0.8 to 1.

As mentioned before very good results with regard to the overall membrane capacity required can be achieved, if the process respectively the apparatus of the present invention are configured such, that the ratio of the pressure ratio over the permeate separation stage (3) to the pressure ratio over the feed stream separation stage (1) is in a range of from 0.6 to 7, preferably of from 0.7 to 6, particular preferred of from 0.9 to 5, especially preferred of from 1 to 5, more preferred of from 1.05 to 4 and most preferred of from 1 to 3.

The apparatus of the invention respectively used in the process of the present invention will now be described in more detail.

The apparatus of the present invention, see FIG. 1 by way of example, comprises an interlinking of three membrane separation stages at least. Each stage consists of one or more physical gas separation modules, which are connected directly or indirectly in parallel and/or in series within one stage. The driving force for gas separation in the modules is a partial pressure difference of the permeate gas created between the retentate and permeate sides in the respective membrane separation stage. As mentioned before, the driving force can be generated by the raw gas stream (17) itself respectively the feed stream (5), i.e. combined raw gas stream (17) and recycling streams (9) and/or (10), if the raw gas stream (17) has sufficient pressure. In most cases, however, the partial pressure differential will be generated either by means of a compressor (4) arranged up-stream of the feed stream separation stage, i.e. on the feed side of the feed stream separation stage (1) and/or by means of at least one, preferably one or two, vacuum device(s) (15)(not shown in FIG. 1), arranged in at least one permeate stream of the feed stream separation stage (1), the retentate separation stage (2) and/or the permeate separation stage (3). Preferably vacuum devices (15) are located in the second permeate stream (9) on the permeate side of the retentate separation stage (2) and/or in the third permeate stream (11) on the permeate side permeate separation stage (3). It may optionally be advantageous, in one or more of the membrane separation stages, to generate or to enhance the partial pressure difference by means of a purge gas stream, preferably a permeate-side purge gas stream.

In a preferred configuration of the present invention, a compressor (4) brings the crude gas stream (17) or a mixture of the crude gas stream (17) and of the second permeate stream (9), as a whole or part, and/or the third retentate stream (10), as a whole or part, to the desired pressure in the range from 5 to 100 bar, but preferably to a pressure of 9 to 75 bar. The compressed stream represents the feed stream (5) or is combined downstream of the compressor (4) with the whole or part of the second permeate stream (9) and/or the third retentate stream (10) to form feed stream (5).

The raw gas stream (17) at the start of operation of the apparatus or the process of the invention or the feed stream (5) may be introduced into the feed stream separation stage (1). The process and the apparatus of the present invention, however, may also be configured such, that the raw gas stream (17) and/or the feed stream (5) and/or a stream in an intermediate stage between raw gas stream (17) and final feed stream (5) is subjected to a pretreatment upstream of the feed stream separation stage (1). A preferred pretreatment step may be a purification step; particular preferred a dehumidification step or a desulfurization step. Another preferred pretreatment step may be a temperature adjustment step of the gas stream. Several options for pretreatment steps upstream, of the feed stream separation stage (1) are known in the art and can easily be added to the process or apparatus by a man skilled in the art. For example in KR10-1327337 and in KR10-1327338 such steps are described. The two Korean patents also describe further variants of a three stage membrane separation process wherein energy or heat generated for example in the compression stage is used in such pretreatment steps or further processing steps of streams (8) and/or (11). Analogue modifications of the process and apparatus of the present invention are also possible. These documents are therefore incorporated by reference in their entirety.

In the feed stream separation stage (1), a pre-separation of the gas mixture of the feed stream (5) into more easily permeating components (permeate gas A), which pass mainly into the permeate of the first stage, and components which permeate less quickly (retentate gas B), which are predominantly retained by the membrane and are enriched in the retentate, is obtained.

The process according to the invention or the inventive apparatus is notable in that it is preferably configured such that the concentration of at least one permeate gas of the feed stream separation stage (1), after recycling of the second permeate stream (9) and of the third retentate stream (10), is increased in the feed stream (5), preferably by at least 2 percent points, particular preferred by 2 to 40 percent points, more preferably by 2 to 30 percent points and most preferably by 3 to 25 percent points, in each case compared to the concentration in the crude gas stream (17). The increase may depend on the composition of the crude gas stream (17) and is particularly high in the case of low concentrations of a permeate gas (10 to 20 Vol. %). Preferably, the increase in concentration of one of the permeate gases is between 2 and 40 percent points, more preferably between 4 and 25 percent points, when the content of the permeate gas in the crude gas stream (17) is between 25 and 75 Vol. % respectively between 9 and 25 percent points if the content of the permeate gas in the crude gas stream (17) is between 25 and 55 Vol. %. This is because the inventors have found that the yield of retentate gas in the overall process increases and hence the loss of retentate gas decreases when the concentration of the permeate gas in the feed stream separation stage (1) is increased.

The cut in the separation stage for a concentration of 50% of a component A or of a permeate gas A in the feed stream (5) to be purified is between 10 and 60%, preferably between 15 and 55% and more preferably between 10 and 50%. In a particularly preferred embodiment of the present invention, the process according to the invention or the inventive apparatus is therefore configured such that the content of permeate gas(es) of the feed stream separation stage (1) in feed stream (5) is greater than or equal to 40% by volume, preferably more than 45% by volume and very particularly more than 50% by volume, based on the volume of the feed stream (5), after recycling of the second permeate stream (9) and of the third retentate stream (10).

This increase in concentration of the permeate gases in the feed stream (5), as already explained, increases the efficiency of the feed stream separation stage (1), which in turn has the result that less retentate gas B passes into the first permeate stream (6). This in turn increases the efficiency of the permeate separation stage (3) and ensures that less unwanted retentate gas passes into the third permeate stream (10) here too. Especially in the case of separation of methane-containing crude gases, this leads to the advantage that the unwanted emissions of methane, which is harmful to the climate, were reduced significantly.

In general, it can be stated that, in the feed stream separation stage (1), preferably 20 to 100%, more preferably 40 to 70%, of component A or of a permeate gas A are transferred from the feed stream (5) to the permeate.

The retentate of the feed stream separation stage (1), optionally with pressure reduction by an optionally present pressure-reducing valve (12), or with a pressure increase, is supplied by means of the first retentate stream (7) to the retentate separation stage (2) in which the fine purification is effected. On the retentate side of the retentate separation stage (2), i.e. in the second retentate stream (8), there is preferably a pressure-reducing valve (13), by means of which the main pressure in the system (operating pressure of separation stages (1) and (2) =retentate pressure of stages (1) and (2)) can be maintained and kept constant. The content of the less easily permeating components or of a retentate gas B is increased further in the retentate separation stage (2), such that the content of component B or of a retentate gas B in the second retentate stream (8) can be more than 90%, preferably more than 95% and more preferably more than 97%. In a particularly preferred variant, the process according to the invention or the inventive apparatus is thus notable in that at least 95%, preferably at least 97%, more preferably at least 99% and most preferably at least 99.5% of the retentate component of the feed stream separation stage (1) which has been introduced into the apparatus with the crude gas stream (17) is obtained in the second retentate stream (8).

As mentioned before, it is possible that the second retentate stream (8) can be further processed, for example further purified or modified or mixed with other gases or liquefied. Such technologies are well known in the art and combination of such technologies with the process and apparatus of the present invention are part of this invention, too.

The stage cut of retentate separation stage (2) is preferably between 10 and 80% and more preferred between 30 and 70% for a gas mixture consisting of 50% by Vol. of component A and 50% by Vol. of Component B in the raw gas stream (17).

The permeate of the feed stream separation stage (1) which has been greatly enriched with component A or a permeate gas A is supplied by means of the first permeate stream (6) to the permeate separation stage (3). If necessary, it is possible by means of a pressure-reducing valve (14) in the retentate stream (10) of the permeate separation stage (3), i.e. the third retentate stream (10), to prevent the pressure of the permeate of the feed stream separation stage (1) from declining to ambient pressure (see FIG. 1). The quotient of the pressure ratio over the permeate separation stage (1) to the pressure ratio over the feed stream separation stage (3) is preferably adjusted via pressure-reducing valve (14) in the retentate stream (10). Preferred values for said pressure ratio are given above.

In this way, the driving force for the permeate separation stage (3) can be maintained. The permeate separation stage (3) preferably produces a permeate with a content of component A or of a retentate gas A of greater than 95%, preferably greater than 97% and more preferably greater than 99%. The permeate gas enriched in the third permeate stream (11) can be withdrawn as product from the apparatus or process of the invention. Alternatively it can be further processed, for example further purified or modified or mixed with other gases or liquefied. Such technologies are well known in the art and combination of such technologies with the process and apparatus of the present invention are part of this invention, too. For example in KR10-1327337; KR10-1327338 and JP 2009-242773 A processes for further treatment of the third permeate stream (11), that can be combined with the process of the invention, are disclosed.

In a particularly preferred embodiment, the inventive apparatus is configured such that not more than 5%, preferably not more than 3%, more preferably not more than 1% and most preferably not more than 0.5% of the retentate component B of the feed stream separation stage (1) introduced into the apparatus with the crude gas stream (17) is comprised in the third permeate stream (11). Stage cut for permeate separation stage (3) is preferably between 60 and 97% and especially preferably between 70 and 95% for a 50:50 mixture of components A and B in the raw gas stream (17).

The second permeate stream (9) and the third retentate stream (10) are recycled, supplied to the feed stream (5) and reprocessed. This can, as already explained above, be effected in different ways and may depend, for example, on whether a compressor (4) or even a multistage compressor (4) is used. In the case of a one-stage compressor (4), streams (9) and (10) are preferably supplied to the suction side of the compressor (4) (see FIG. 1). If a multistage compressor is used, it is preferable that streams (9) and (10) are introduced into the compressor between two compression stages. In a preferred embodiment streams (9) and (10) are recycled without total decompression into an elevated compression stage of the compressor (4) and/or the permeate of the second stage is recycled into an elevated compression stage of the compressor (4).

As already explained, it is particularly advantageous when a multistage compressor (4) is used. This is because it is possible in this case to dispense with a complete decompression of the retentate of the permeate separation stage (3), since the retentate of the permeate separation stage (3) can be fed in between two compressor stages of the compressor (4).

Since the retentate separation stage (2), in the case of decompression to feed pressure, would generally be operated in the selectivity-limited range, it may be advisable to decompress the second permeate stream (9) merely to a higher pressure level of a multistage pressure-increasing unit, i.e. of a multistage compressor (4), since this reduces the operating costs for the compression unit without distinctly worsening the separation outcome. In a particularly preferred embodiment of the present invention, therefore, a multistage compressor (4) is used and the gas streams (9) and (10) are supplied to this compressor in each case between two compression stages.

The process according to the invention or the inventive apparatus is notable particularly in that it is configured such that the gas volume recycled in the second permeate stream (9) and in the third retentate stream (10) totals 60 to 200% by volume of the volume of the crude gas stream (17). Preferred ranges are given above. The control of the volume of the gas streams to be recycled can be controlled, for example, through selection of the respective membrane modules in the membrane separation stages (1) to (3) or by the pressures in the system or by the flows. The first permeate stream (6) is preferably conducted such that the feed pressure of the permeate separation stage (3), preferably by means of a pressure-reducing valve (14) on the retentate side of the permeate separation stage (3), is between 1 and 30 bar, preferably between 2 and 20 bar and more preferably 2 and 15 bar.

As already mentioned, the inventive apparatus may comprise one or more pressure-reducing valves (12), (13) or (14). In a preferred embodiment, preferably by means of a pressure-reducing valve (14), it is ensured that the pressure drop over the feed stream separation stage (1) is restricted to between 1 and 30 bar, preferably between 2 and 20 bar, more preferably between 2 and 10 bar.

Simultaneously or alternatively, preferably by means of a pressure-reducing valve (13), it is ensured that the pressure drop over the feed stream separation stage (1) and the retentate separation stage (2), is restricted to 1 and 100 bar, preferably between 5 and 80 bar and more preferably between 10 and 70 bar.

The inventive apparatus or the process according to the invention can in principle be implemented with all membranes which are capable of separating binary gas mixtures or multigas mixtures. The membrane materials used are preferably but not exclusively polymers. Useful polymers in the separation-active layer are more preferably polyimides, polyetherimides, polyaramides, polybenzoxazoles, polybenzothiazoles, polybenzimidazoles, polyamides, polysulfones, cellulose acetates and derivatives, polyphenylene oxides, polysiloxanes, polymers with intrinsic microporosity, mixed matrix membranes, facilitated transport membranes, polyethylene oxides, polypropylene oxides, carbon membranes or zeolites, or mixtures thereof.

Particularly preferred membranes include as materials for the separation-active layer, or as a material for the complete membrane, a polyimide consisting of the monomer units A and B, wherein with $0 \leq x \leq 0.5$ and $1 \geq y \geq 0.5$ and wherein R corresponds to one or more, identical or different radicals selected from the group consisting of the radicals L1, L2, L3 and L4

It is particularly preferable for a polymer to be used where x=0, Y=1 and R is 64 mol % L2, 16 mol % L3 and 20 mol % L4. This polymer is available from Evonik Fibres GmbH under the name P84 or P84 type 70 (CAS numbers 9046-51-9). Another polymer with specific preference is a polymer having the composition x=0.4, y=0.6 and R being 80 mol % L2 and 20 mol % L3. This polymer is available from Evonik Fibres GmbH under the name P84HT or P84 HT 325 (CAS numbers 134119-41-8). It is similarly preferable to use mixtures of said polyimides.

Membranes made of the preferred polyimides are available from Evonik Fibres GmbH under the name Sepuran. A process for producing these preferred membranes is disclosed in WO 2011/009919 A1. Membranes disclosed in this Offenlegungsschrift can always be used with preference in the method of the present invention. To avoid pure repetition, the content of this patent application is hereby incorporated herein in its entirety by reference. It was found that these membranes gave very good separation outcomes.

The membranes are preferably used in the form of hollow fiber membranes and/or flat membranes. The membranes are assembled into modules, which are then used in the separation task. The modules used may be all gas separation modules known in the prior art, for example but not exclusively hollow fiber gas separation modules, spiral-wound gas separation modules, cushion gas separation modules or tube bundle gas separation modules.

Preferably the gas separation membrane modules have a pure gas selectivity for $CO_2/CH_4$ of at least 10, preferably at least 15, more preferably at least 20, especially preferred 20 to 100, even more preferred of at least 20 to 80 and most preferred 40 to 70. Compared to the prior art process according to WO 2012/000727, which is operated under energy optimized conditions, the process and the apparatus of the present invention are intended for use under minimized invest and maintenance cost aspects. Thus, it is preferred in the present invention to use membranes with lower selectivities compared to WO 2012/000727. Examples 1.1 and 1.2 below show that this concept works well. Nevertheless, it is also possible to use membranes with higher selectivities in the process and apparatus of the present invention as shown in the other examples.

The process according to the invention/the inventive apparatus have the particular advantages that there is no need for any additional purification of the permeate and/or retentate streams (11) or (8) for many applications. For example, in the case of purification of biogas or natural gas(=removal of carbon dioxide from methane), there is no longer any need for a pressure swing adsorption or amine scrubbing for fine purification of the retentate, and so it can be fed into the natural gas grid. Nevertheless, as mentioned above, additional purification or further processing steps may follow after the process or apparatus of the present invention. As mentioned before, the fact that there is no need for further treatment of streams (8) and (11) does not exclude such steps from the scope of the present invention.

The method/apparatus of the present invention can be used to produce, at one and the same time, a pure retentate stream (8) and a pure permeate stream (11) in biogas and natural gas purification. $CO_2$ can therefore be released into the atmosphere without great losses of methane and without major impairment of the environment, without any need for further treatment of the gas by a catalytic or thermal after burn or utilization in a combined heat and power plant. No capital expenditure on further plant facilities is accordingly required, which leads to a more economical purification process for biogas and natural gas.

A further advantage is considered to be that the process according to the invention/the inventive apparatus needs a much lower level of apparatus complexity and energy expenditure than the known prior art processes.

Especially through the combination of the inventive features of control of the volume of the recycled streams (9) and (10), increased membrane capacity in the retentate separation stage (2) compared to that of the feed stream separation stage (1) and preferably also to that of the permeate separation stage (3) and of the quotient of the pressure loss over the permeate separation (3) stage to the pressure loss over the feed stream separation stage (1) an apparatus or a process much superior with regard to invest and in particular to maintenance costs, compared to the prior art processes can be provided.

The inventive apparatus or the process according to the invention can especially be used for separation of biogas or natural gases or air or other gas mixtures comprising: carbon dioxide and methane, hydrogen and methane, carbon monoxide and methane, helium and methan, helium and nitrogen, hydrogen and carbon monoxide, permanent gas having a boiling point less than 110 Kelvin at 1 atm and non permanent gas having a boiling point above or equal to 110 Kelvin at 1 atm, carbon dioxide and hydrocarbon or nitrogen and hydrocarbon.

Measurement Methods:
Selectivity of Membranes

Gas permeabilities are reported in barrers ($10^{-10}$ $cm^3 \cdot cm^{-2} \cdot cm \cdot s^{-1} \cdot cmHg^{-1}$). Permeances of hollow fiber membranes to gases are reported in GPU (Gas Permeation Unit, $10^{-6}$ $cm^3 \cdot cm^{-2} \cdot cm \cdot s^{-1} \cdot cmHg^{-1}$).

Flat Membranes

For determination of the selectivity of flat membranes permeabilities to pure gases are measured by the pressure rise method. A flat sheet film between 10 and 70 μm in thickness has a pure gas applied to it from one side. On the other side, the permeate side, there is a vacuum (ca. $10^{-2}$ mbar) at the start of the test. Then, pressure rise on the permeate side over time is recorded. The polymer's permeability can be computed by the following formula:

$$P = \frac{V_{dead} \cdot MW_{gas} \cdot l}{\rho \cdot R \cdot T \cdot A \cdot \Delta p} \cdot \frac{dp}{dt} \cdot 10^{10}$$

P ... Permeability in barrers ($10^{-10}$ $cm^3 \cdot cm^{-2} \cdot cm \cdot s^{-1} \cdot cmHg^{-1}$)
$V_{dead}$ ... Volume of permeate side in $cm^3$
$MW_{gas}$ ... Molar mass of gas in $g \cdot mol^{-1}$
l ... Thickness of film in cm
ρ ... Density of gas in $g \cdot cm^{-3}$
R ... Gas constant in $cm^3 \cdot cmHg \cdot K^{-1} \cdot mol^{-1}$
T ... Temperature in kelvins (room temperature, ~23° C.)
A ... Area of film in $cm^2$ (~12 $cm^2$)
Δp ... Pressure difference between feed and permeate side in cmHg
dp/dt . Pressure rise per time on permeate side in $cmHg \cdot s^{-1}$ The selectivity of the flat membrane according to the present invention for various pairs of gases is a pure-gas selectivity. It is calculated from the ratio of permeabilities of the pure gases as follows:

$$S = \frac{P_1}{P_2}$$

S ... pure gas selectivity
$P_1$ ... permeability of gas 1
$P_2$ ... permeability of gas 2

Hollow Fiber Membranes

The permeance of hollow fibers is measured using a volume rise method. For this, the flux (at standard temperature and standard pressure) at the permeate site at constant pressure is measured.

For hollow fibers it is necessary to measure the permeance P/l since the thickness of the separating layer is unknown. The permeance is computed by the following formula:

$$P/l = \frac{Q(STP)}{R \cdot T \cdot A \cdot \Delta p} \cdot 10^6$$

P/I ... permeance in GPU (gas permeation units. $10^{-6}$ $cm^3 \cdot cm^{-2} \cdot s^{-1} \cdot cmHg^{-1}$)
Q ... gas flux of permeate side in $cm^3$ (STP)/s
R ... gas constant in $cm^3 \cdot cmHg \cdot K^{-1} \cdot mol^{-1}$
T ... temperature in kelvins (room temperature, ~23° C.)
A ... membrane surface, i.e. external area as defined above, of hollow fiber in $cm^2$ (between 60 and 80 $cm^2$)
Δp ... pressure difference between feed and permeate side in cmHg The selectivity of the hollow fiber membrane according to the present invention for various pairs of gases is a pure-gas selectivity. It is calculated from the permeances of the pure gases as follows:

$$S = \frac{P_1}{P_2}$$

S ... pure gas selectivity
$P_1$ permeance of gas 1
$P_2$ permeance of gas 2

The examples which follow are intended to illustrate and describe the present invention in detail, but do not restrict it in any way.

Membrane Capacity

The calculation method as well as the reference gas and the standard conditions are described below.

Hollow Fiber Membranes:

The membrane capacity of the hollow fiber membrane (HFM) calculates as follows:

$$Capacity_{(HFM)} = Permeance_{(HFM)} * Surface_{(HFM)}$$

Wherein the permeance(HFM) is tested under the following standard conditions:
Reference gas: Nitrogen, Grade 4.8
Temperature: instead of room temperature as applied above for the permeance measurement to calculate the selectivities; for the capacity calculation, the permeance is determined at the average operating temperature of the membrane, which is usually the operating temperature of the separation stage Retentate pressure: 11 bara
Permeate pressure: 1.1 bara
and the surface(HFM) correlates to the external membrane surface as defined in the definitions section in this disclosure.

Flat Membranes:

The membrane capacity of the flat membranes (FM) calculates as follows:

$$Capactity_{(FM)} = Permeance_{(FM)} * Surface_{(FM)}$$

Wherein the permeability(FM) is tested under the following standard conditions:
Reference gas: Nitrogen, Grade 4.8
Temperature: instead of room temperature as applied above for the permeability measurement to calculate the selectivities; for the capacity calculation, the permeability is determined at the average operating temperature of the membrane, which is usually the operating temperature of the separation stage
Retentate pressure: 11 bara
Permeate pressure: 1.1 bara The permeance is then calculated by dividing the permeability through the thickness of the FM. The surface$_{(FM)}$ correlates to the external membrane surface as defined in the definitions section in this disclosure.

The examples provided below are intended to illustrate the invention in more detail for a deeper understanding. They must not be construed in any way to limit the scope of the present invention.

EXAMPLES

In all examples and reference examples the membrane capacity relates to nitrogen (Grade 4.8) and were measured under the standard conditions described above.

General Description of the Simulation:
The simulation is based on the following assumptions:
Steady state
Ideal gas
Ideal counter current in the membrane module
No viscosity effects (no pressure loss on retentate or permeate flow)
No sweep gas
Constant temperature within each separation stage. Unless otherwise stated all separation stages in the examples are operated at identical temperatures.

The simulation is done as follows:
The following scheme of two flow channels separated by a membrane (double dotted line) was used to derive the equations needed for the simulation. NFi is a molar flow of component i at the high pressure side of the membrane. NPi is a molar flow of component i at the low pressure side of the membrane. Regarding to this scheme a feed entering the membrane is the sum of all molar component flows NFi (z=0) entering the membrane. Consequently, the retentate flow exiting the membrane is the sum of all molar component flows NFi (z=L). The permeate flow exiting the membrane is the sum of all molar component flows NPi (z=0). As there is no sweep flow entering the membrane on the opposite side of the permeate outlet these molar component flows NPi (z=L) are set to be zero.

The local molar flow of a component i through the membrane is its molar permeance Pi times the membrane area Udz times its local driving force, the local difference in partial pressure between feed and permeate side. pF and pP are the feed and the permeate pressure. The local molar concentration of component i on the feed or permeate side can be derived dividing the local molar feed or retentate flow of component i by the sum of all local molar component flows. From this the following set of equations can be derived.

$$\frac{d\dot{N}_{F_i}}{dz} = -\dot{P}_i \cdot U \left( \frac{\dot{N}_{F_i}}{\sum_j \dot{N}_{F_j}} \cdot p_F - \frac{\dot{N}_{P_i}}{\sum_j \dot{N}_{P_j}} \cdot p_P \right)$$

$$\frac{d\dot{N}_{P_i}}{dz} = \dot{P}_i \cdot U \left( \frac{\dot{N}_{F_i}}{\sum_j \dot{N}_{F_j}} \cdot p_F - \frac{\dot{N}_{P_i}}{\sum_j \dot{N}_{P_j}} \cdot p_P \right)$$

Including the boundary conditions described above the equations was solved in software Aspen Custom Modeler (ACM), however, other softwares like MATLAB, MathCad can also be used.

Reference Example 1

The Comparative-Example of WO 2012/000727 A1 was reproduced. Characteristics of this example are:
A recycled gas volume in sum of 86.7%
Identical membrane capacities in all three separation stages
A quotient of the pressure ratio over the permeate separation stage (3) to the pressure ratio over the feed stream separation stage (1) of 1.0.
Membrane selectivity for $CO_2/CH_4=20$ in all separation stages Thus, the reference example differs from the present invention in that the membrane capacities are identical in all three stages.

Example 1.1

Reference Example 1 was adopted in an inventive manner, i.e. the "recycling rate", the "membrane capacity" of the retentate separation stage (2) and the "quotient of the pressure ratios of separation stage (3) over separation stage (1)" were increased. The recycling rate and the purities of product streams (8) and (11), however, were chosen identical respectively nearly identical to In detail:
A crude gas mixture of 50 Vol. % methane and 50 Vol. % carbon dioxide, which corresponds approximately to a biogas mixture, was introduced into a mixing chamber (not shown in FIG. 1), fed via stream (17) to compressor (4) and compressed. After a first cycle, stream (17) was combined with recycled gas streams (9) and (10), fed to compressor (4) and compressed. After the steady state was reached, compressed gas stream (5), having a temperature of 20° C., was applied to feed stream separation stage (1) at flowrate of 3.53 m³/h. The recycling rate via streams (9) and (10) in sum was 98% by volume of the crude gas stream (17). The operating pressure of the system was 18.2 bara.

The membrane capacity of the retentate separation stage (2) was 2.29 times higher than that of the feed stream separation stage (1) and 2.19 times higher than that of the permeate separation stage (3). The quotient of the pressure ratio over the permeate separation stage (3) to the pressure ratio over the feed stream separation stage (1) was 2.2.

These settings lead to a retentate (8) of the retentate separation stage (2) having a content of 98.5 Vol. % methane and 1.5 Vol. % carbon dioxide, analogue to Reference Example 1. 0.892 m³/h of this mixture leaves retentate separation stage (2) via stream (8). The permeate (9) of retentate separation stage (2) had a volume flow rate of 1.631 m³/h with a methane content of 19.7 Vol. % and a carbon dioxide content of 80.3 Vol. %, and was recycled via the second permeate stream (9) into the mixing chamber and compressed again by the compressor (4).

The retentate (7) of the feed stream separation stage (1) had a volume flow rate of 2.52 m³/h with a carbon dioxide content of 52.4 Vol. % and a methane content of 47.6 Vol. %, and was fed via the first retentate stream (7) into the retentate separation stage (2). The permeate (6) of feed stream separation stage (1) had a volume flow rate of 1.00 m³/h with a carbon dioxide content of 93.1 Vol. % and a methane content of 6.9 Vol. %, and was fed via the first permeate stream (6) into the permeate separation stage (3).

The pressure drop over feed stream separation stage (1) did not extend to ambient pressure, but was limited to 6.4 bara by a reducing valve (14) on the retentate side of permeate separation stage (3). Thus, a third permeate stream (11) having a volume flow rate of 0.888 m³/h, with a composition of 98.7 Vol. % carbon dioxide and only 1.3 Vol. % methane, was obtained. The composition of permeate stream (11) is nearly identical with Reference Example 1, where the carbon dioxide content is 99 Vol. %. The third retentate stream (10) from the permeate separation stage (3) had a volume flow rate of 0.113 m³/h with a composition of 51.3 Vol. %% methane and 48.7 Vol. % carbon dioxide and was recycled.

As mentioned above, Example 1.1 differs from Reference example 1 in that the "recycling rate", the "ratio of membrane capacity of stage (2) to stage (1) respectively of stage (2) to stage (3)" and the "quotient of the pressure ratio" were increased. The effect was, that the total membrane capacity, in sum for all three separation stages, of Example 1.1 was 14.9% lower than in Reference Example 1. In other words, in the inventive set-up of the apparatus respectively process, invest cost could be reduced because the required total membrane capacity could be reduced.

Example 1.2

Reference Example 1 was reproduced again, however, in Example 1.2 only the parameters , "ratio of membrane capacity of stage (2) to stage (1) respectively of stage (2) to stage (3)" and the "quotient of the pressure ratio" were increased. In contrast to Example 1.1, the "recycling rate" was chosen identical to Reference Example 1 in order to show, what happens, if only two parameters were modified in an inventive manner.

The process parameters of Example 1.2 are summarized in Table 1 and 2 below:

TABLE 1

| Stream number | 17 | 5 | 6 | 7 | 8 | 9 | 10 | 11 |
|---|---|---|---|---|---|---|---|---|
| press [bar] | 1.01 | 18.2 | 6.1 | 18.2 | 18.2 | 1.01 | 6.1 | 1.01 |
| flow [m³/h] | 1.78 | 3.32 | 1.04 | 2.28 | 0.89 | 1.39 | 0.15 | 0.89 |
| T [° C.] | | 20 | | | | | | |

TABLE 1-continued

| Stream number | 17 | 5 | 6 | 7 | 8 | 9 | 10 | 11 |
|---|---|---|---|---|---|---|---|---|
| $CH_4$ [Vol. %] | 50 | 38.2 | 7.9 | 52.1 | 98.5 | 22.2 | 46.6 | 1.4 |
| $CO_2$ [Vol. %] | 50 | 61.8 | 92.2 | 47.9 | 1.5 | 77.8 | 53.4 | 98.7 |

TABLE 2

| | |
|---|---|
| Total gas volume recycled in streams (9) and (10) compared to the volume of the crude gas stream (17) | 86.7% |
| Ratio of membrane capacity in stage (2) compared to stage (1) | 1.97 |
| Ratio of membrane capacity in stage (2) compared to stage (3) | 1.92 |
| Ratio retentate pressure to permeate pressure stage (1) | 3.0 |
| Ratio retentate pressure to permeate pressure stage (3) | 6.0 |
| Quotient of pressure ratio over stage (3) over stage (1) | 2.0 |
| Purity $CH_4$ in Stream (8) | 98.5 |
| Purity $CO_2$ in Stream (11) | 98.7 |

In Example 1.2 a total saving of 14.5% of membrane capacity, in sum for all three separation stages, compared to Reference Example 1, was achieved.

This shows that the increase of the membrane capacity of separation stage (2) has a significant impact on the reduction of the total membrane capacity needed. Compared to Example 1.1, Example 1.2 shows, that an additional reduction of the overall required membrane capacity could be achieved if the recycling rate is increased, too.

Comparative Example 1

In Comparative Example 1 Reference Example 1 was modified in a none inventive manner. In particular, the "recycling rate" was reduced to 49 Vol. % of the crude gas stream (17). In addition, the membrane capacity of the retentate separation stage (2) was reduced, i.e. was lower than that of the feed stream separation stage (1) and 1 of the permeate separation stage (3). The "quotient of pressure ratios" was not modified, i.e. was identical to Reference Example 1.

The process parameters of Comparative Example 1 are summarized in Table 3 and 4 below:

TABLE 3

| Stream number | 17 | 5 | 6 | 7 | 8 | 9 | 10 | 11 |
|---|---|---|---|---|---|---|---|---|
| press [bar] | 1.01 | 18.2 | 4.2 | 18.2 | 18.2 | 1.01 | 4.2 | 1.01 |
| flow [m³/h] | 1.78 | 2.65 | 1.33 | 1.31 | 0.88 | 0.43 | 0.44 | 0.90 |
| T [° C.] | | 20 | | | | | | |
| $CH_4$ [Vol. %] | 50 | 48.6 | 16.0 | 81.7 | 98.5 | 47.4 | 43.9 | 2.5 |
| $CO_2$ [Vol. %] | 50 | 51.4 | 84.0 | 18.3 | 1.5 | 52.6 | 56.1 | 97.5 |

TABLE 4

| | |
|---|---|
| Total gas volume recycled in streams (9) and (10) compared to the volume of the crude gas stream (17) | 49% |
| Ratio of membrane capacity in stage (2) compared to stage (1) | 1.54 |
| Ratio of membrane capacity in stage (2) compared to stage (3) | 1.66 |
| Ratio retentate pressure to permeate pressure stage (1) | 4.3 |
| Ratio retentate pressure to permeate pressure stage (3) | 4.2 |
| Quotient of pressure ratio over stage (3) over stage (1 ) | 1.0 |
| Purity $CH_4$ in Stream (8) | 98.5% |
| Purity $CO_2$ in Stream (11) | 97.5% |

As indicated before, Comparative Example 1 represents a modification of Reference Example 1 to the opposite direction compared to the present invention. It was found, that the membrane capacity, in sum for all three separation stages, required in Comparative Example 1, compared to Reference Example 1, was increased by 7.5%. In addition to Examples 1.1 and 1.2 were it was shown, that an inventive set-up leads to a significantly decrease in membrane capacity, Comparative Example 1 shows, that a non-inventive modification of the prior art even increases the required membrane capacity, i.e. causes an increase in maintenance costs, instead of savings.

Reference Example 2

Example 1 of WO 2012/000727 A1 was reproduced. Characteristics of this example are:
  A recycled gas volume in sum of 31.2%
  Identical membrane capacities in all three separation stages
  A quotient of the pressure ratio over the permeate separation stage (3) to the pressure ratio over the feed stream separation stage (1) of 1.34.
  Membrane selectivity for $CO_2/CH_4$=45 in all separation stages Example 2

Reference Example 2 was modified in that the "recycling rate" was increased to 71% and the "membrane capacity of stage (2)" as well as the "quotient of pressure ratios" were increased, too. The operating temperature in all separation stages was 20° C. Details of the process parameters are given in Tables 5 and 6 below:

TABLE 5

| Stream number | 17 | 5 | 6 | 7 | 8 | 9 | 10 | 11 |
|---|---|---|---|---|---|---|---|---|
| press [bar] | 1.01 | 18.4 | 5.95 | 18.4 | 18.4 | 1.01 | 5.95 | 1.01 |
| flow [m³/h] | 1 | 1.707 | 0.536 | 1.171 | 0.506 | 0.665 | 0.042 | 0.494 |
| T [° C.] | | 20 | | | | | | |
| $CH_4$ [Vol. %] | 50 | 35.2 | 3.3 | 49.8 | 98.5 | 12.7 | 38.3 | 0.3 |
| $CO_2$ [Vol. %] | 50 | 64.8 | 96.7 | 50.2 | 1.5 | 87.3 | 61.7 | 99.7 |

TABLE 6

| | |
|---|---|
| Total gas volume recycled in streams (9) and (10) compared to the volume of the crude gas stream (17) | 71% |
| Ratio of membrane capacity in stage (2) compared to stage (1) | 2.38 |
| Ratio of membrane capacity in stage (2) compared to stage (3) | 2.23 |
| Ratio retentate pressure to permeate pressure stage (1) | 3.1 |
| Ratio retentate pressure to permeate pressure stage (3) | 5.9 |
| Quotient of pressure ratio over stage (3) over stage (1) | 1.9 |
| Purity $CH_4$ in Stream (8) | 98.5% |
| Purity $CO_2$ in Stream (11) | 99.7% |

Due to the inventive modifications, the total membrane capacity required in Example 2 could be reduced, compared to Reference Example 2, by 15%.

Examples 1.1 and 1.2, with a membrane selectivity for $CO_2/CH_4$ of 20, and Example 2 with a selectivity for $CO_2/CH_4$ of 45 confirm, that the inventive apparatus and process set-up leads to improvements of the required overall membrane capacity for low as well as for higher selective membranes. In Example 5 below it will be demonstrated, that even membranes with a selectivity of 70 for $CO_2/CH_4$ can be used in the process of the invention. In all cases reduced invest and maintenance costs were achieved compared to a non-inventive three-stage separation process.

Reference Example 3

Example 3 of WO 2012/000727 A1 was reproduced. Characteristics of this example are:
  A recycled gas volume in sum of 41.7%
  Identical membrane capacities in all three separation stages
  A quotient of the pressure ratio over the permeate separation stage (3) to the pressure ratio over the feed stream separation stage (1) of 1.33.
  Membrane selectivity for $CO_2/CH_4$=45 in all separation stages
  A vacuum pump was used in permeate stream (9)

Example 3

Reference Example 3 was modified in that the "recycling rate" was increased to 77% and the "membrane capacity of stage (2)" as well as the "quotient of pressure ratios" were increased, too. The operating temperature in all separation stages was 20° C. Details of the process parameters are given in Tables 7 and 8 below:

TABLE 7

| Stream number | 17 | 5 | 6 | 7 | 8 | 9 | 10 | 11 |
|---|---|---|---|---|---|---|---|---|
| press [bar] | 1.01 | 14.5 | 5.15 | 14.5 | 14.5 | 0.2 | 5.15 | 1.01 |
| flow [m³/h] | 1 | 1.772 | 0.531 | 1.241 | 0.506 | 0.735 | 0.037 | 0.494 |
| T [° C.] | | 20 | | | | | | |
| $CH_4$ [Vol. %] | 50 | 32.5 | 3.0 | 45.1 | 98.5 | 8.4 | 38.9 | 0.3 |
| $CO_2$ [Vol. %] | 50 | 67.5 | 97.0 | 54.9 | 1.5 | 91.7 | 61.1 | 99.7 |

TABLE 8

| | |
|---|---|
| Total gas volume recycled in streams (9) and (10) compared to the volume of the crude gas stream (17) | 77% |
| Ratio of membrane capacity in stage (2) compared to stage (1) | 1.84 |
| Ratio of membrane capacity in stage (2) compared to stage (3) | 1.79 |
| Ratio retentate pressure to permeate pressure stage (1) | 2.8 |
| Ratio retentate pressure to permeate pressure stage (3) | 5.1 |

TABLE 8-continued

| | |
|---|---|
| Quotient of pressure ratio over stage (3) over stage (1) | 1.8 |
| Purity $CH_4$ in Stream (8) | 98.5% |
| Purity $CO_2$ in Stream (11) | 99.7% |

Caused by the inventive modifications a saving of 8% of the total membrane capacity compared to Reference 3 was achieved. Thus, the process of the invention also works with a vacuum pump in a permeate stream.

Example 4 and Comparative Example 4

Example 4 and Comparative Example 4 are intended to show that the inventive process and apparatus also works with a gas mixture with high $CH_4$ and low $CO_2$ content. The operating temperature in all separation stages was 25° C. In both examples an apparatus according to FIG. 1 was used. The parameters of the simulations are given in Table 9 below:

TABLE 9

| Feature | Example 4 | Comp. Ex. 4 |
|---|---|---|
| Crude gas composition [$CH_4$ to $CO_2$ each in Vol. %] | 75 to 25 | 75 to 25 |
| Membrane Selectivity $CO_2/CH_4$ | 20 in all stages | 20 in all stages |
| Operating Pressure [bar] | 17 | 17 |
| Pressurizing device | Compressor | Compressor |
| Flow rate stream (5) at steady state [m³/h] | 1.695 | 1.495 |
| Recycling Rate in sum of streams (9) and (10) | 70 | 49 |
| Ratio of membrane capacity stage (2) compared to stage (1) | 2.58 | 1.0 |
| Ratio of membrane capacity stage (2) compared to stage (3) | 2.38 | 1.0 |
| Ratio retentate pressure to permeate pressure stage (1) | 3.9 | 5.0 |
| Ratio retentate pressure to permeate pressure stage (3) | 4.3 | 3.4 |
| Quotient of pressure ratio over stage (3) over stage (1) | 1.1 | 0.7 |
| Composition stream (8) [$CH_4$ to $CO_2$ each in Vol. %] | 97 to 3 | 97 to 3 |
| Flow rate of stream (8) [m³/h] | 0.767 | 0.764 |
| Composition stream (9) [$CH_4$ to $CO_2$ each in Vol. %] | 28.4 to 71.6 | 42.4 to 57.6 |
| Flow rate stream (9) [m³/h] | 0.611 | 0.297 |
| Composition stream (7) [$CH_4$ to $CO_2$ each in Vol. %] | 66.6 to 33.4 | 81.75 to 18.25 |
| Flow rate stream (7) [m³/h] | 1.378 | 1.061 |
| Composition stream (6) [$CH_4$ to $CO_2$ each in Vol. %] | 14.6 to 85.4 | 22.4 to 77.6 |
| Flow rate stream (6) [m³/h] | 0.317 | 0.434 |
| Composition of stream (10) [$CH_4$ to $CO_2$ each in Vol. %] | 48.4 to 51.6 | 44.7 to 55.3 |
| Flow rate of stream (10) [m³/h] | 0.084 | 0.198 |
| Composition of stream (11) [$CH_4$ to $CO_2$ each in Vol. %] | 2.5 to 97.5 | 3.7 to 96.3 |
| Flow rate of stream (11) [m³/h] | 0.233 | 0.236 |

The total membrane capacity required in Example 4 was 12.4% below that of Reference Example 4. Accordingly, the process and apparatus of the invention is beneficial also for gas mixtures with a high methane content.

Example 5 and Comparative Example 5

Example 5 and Comparative Example 5 are intended to show that the inventive process and apparatus also works with high selective membranes. The operating temperature in all separation stages was 25° C. In both examples an apparatus according to FIG. 1 was used. The parameters of the simulations are given in Table 10 below:

TABLE 10

| Feature | Example 5 | Comp. Ex. 5 |
|---|---|---|
| Crude gas composition [$CH_4$ to $CO_2$ each in Vol. %] | 45 to 55 | 45 to 55 |
| Membrane Selectivity $CO_2/CH_4$ | 70 in all stages | 70 in all stages |
| Operating Pressure [bar] | 17 | 17 |
| Pressurizing device | Compressor | Compressor |
| Flow rate stream (5) at steady state [m³/h] | 1.625 | 1.311 |
| Recycling Rate in sum of streams (9) and (10) | 62 | 31 |
| Ratio of membrane capacity stage (2) compared to stage (1) | 1.9 | 1.0 |
| Ratio of membrane capacity stage (2) compared to stage (3) | 1.9 | 1.0 |
| Ratio retentate pressure to permeate pressure stage (1) | 2.9 | 3.6 |
| Ratio retentate pressure to permeate pressure stage (3) | 5.8 | 4.6 |
| Quotient of pressure ratio over stage (3) over stage (1) | 2 | 1.3 |
| Composition stream (8) [$CH_4$ to $CO_2$ each in Vol. %] | 97 to 3 | 97 to 3 |
| Flow rate of stream (8) [m³/h] | 0.463 | 0.463 |
| Composition stream (9) [$CH_4$ to $CO_2$ each in Vol. %] | 92.8 to 7.2 | 13.7 to 86.3 |
| Flow rate stream (9) [m³/h] | 0.597 | 0.256 |
| Composition stream (7) [$CH_4$ to $CO_2$ each in Vol. %] | 46.4 to 53.6 | 67.35 to 32.65 |
| Flow rate stream (7) [m³/h] | 1.060 | 0.718 |
| Composition stream (6) [$CH_4$ to $CO_2$ each in Vol. %] | 1.9 to 98.1 | 3.6 to 96.4 |
| Flow rate stream (6) [m³/h] | 0.565 | 0.593 |

TABLE 10-continued

| Feature | Example 5 | Comp. Ex. 5 |
|---|---|---|
| Composition of stream (10) [$CH_4$ to $CO_2$ each in Vol. %] | 36.2 to 63.8 | 36 to 64 |
| Flow rate of stream (10) [$m^3/h$] | 0.028 | 0.056 |
| Composition of stream (11) [$CH_4$ to $CO_2$ each in Vol. %] | 0.13 to 99.87 | 0.21 to 99.79 |
| Flow rate of stream (11) [$m^3/h$] | 0.537 | 0537 |

The total membrane capacity in Example 5 was 8.4% below that of Reference Example 5. This shows, that the process and apparatus of the invention are beneficial when using high selective membranes.

Example 6 and Comparative Example 6

Example 6 and Comparative Example 6 are intended to show that the inventive process and apparatus also works with a low operating pressure. The operating temperature in all separation stages was 25° C. In both examples an apparatus according to FIG. 1 was used. The parameters of the simulations are given in Table 11 below:

TABLE 11

| Feature | Example 6 | Comp. Ex. 6 |
|---|---|---|
| Crude gas composition [$CH_4$ to $CO_2$ each in Vol. %] | 45 to 55 | 45 to 55 |
| Membrane Selectivity $CO_2/CH_4$ | 45 in all stages | 45 in all stages |
| Operating Pressure [bar] | 7 | 7 |
| Pressurizing device | Compressor | Compressor |
| Flow rate stream (5) at steady state [$m^3/h$] | 1.851 | 1.353 |
| Recycling Rate in sum of streams (9) and (10) | 85 | 35 |
| Ratio of membrane capacity stage (2) compared to stage (1) | 3 | 0.73 |
| Ratio of membrane capacity stage (2) compared to stage (3) | 2.6 | 1.0 |
| Ratio retentate pressure to permeate pressure stage (1) | 2.6 | 2.6 |
| Ratio retentate pressure to permeate pressure stage (3) | 2.7 | 2.7 |
| Quotient of pressure ratio over stage (3) over stage (1) | 1.04 | 1.04 |
| Composition stream (8) [$CH_4$ to $CO_2$ each in Vol. %] | 97 to 3 | 97 to 3 |
| Flow rate of stream (8) [$m^3/h$] | 0.462 | 0.450 |
| Composition stream (9) [$CH_4$ to $CO_2$ each in Vol. %] | 13.6 to 86.4 | 32.1 to 67.9 |
| Flow rate stream (9) [$m^3/h$] | 0.808 | 0.265 |
| Composition stream (7) [$CH_4$ to $CO_2$ each in Vol. %] | 44 to 56 | 73 to 27 |
| Flow rate stream (7) [$m^3/h$] | 1.270 | 0.715 |
| Composition stream (6) [$CH_4$ to $CO_2$ each in Vol. %] | 3 to 97 | 11.9 to 88.1 |
| Flow rate stream (6) [$m^3/h$] | 0.581 | 0.638 |
| Composition of stream (10) [$CH_4$ to $CO_2$ each in Vol. %] | 36.4 to 63.6 | 70.9 to 29.1 |
| Flow rate of stream (10) [$m^3/h$] | 0.043 | 0.088 |
| Composition of stream (11) [$CH_4$ to $CO_2$ each in Vol. %] | 0.37 to 99.63 | 2.4 to 97.6 |
| Flow rate of stream (11) [$m^3/h$] | 0.538 | 0550 |

The total membrane capacity in Example 6 was 27.9% below that of Reference Example 6. This shows that process and apparatus of the invention are beneficial also, if low operating pressures are applied.

Example 7 and Comparative Example 7

Example 7 and Comparative Example 7 are intended to test the inventive process and apparatus at high operating pressures. The operating temperature in all separation stages was 25° C. In both examples an apparatus according to FIG. 1 was used. The parameters of the simulations are given in Table 12 below:

TABLE 12

| Feature | Example 7 | Com. Ex. 7 |
|---|---|---|
| Crude gas composition [$CH_4$ to $CO_2$ each in Vol. %] | 45 to 55 | 45 to 55 |
| Membrane Selectivity $CO_2/CH_4$ | 45 in all stages | 45 in all stages |
| Operating Pressure [bar] | 40 | 40 |
| Pressurizing device | Compressor | Compressor |
| Flow rate stream (5) at steady state [$m^3/h$] | 1.661 | 1.317 |

TABLE 12-continued

| Feature | Example 7 | Com. Ex. 7 |
|---|---|---|
| Recycling Rate in sum of streams (9) and (10) | 66 | 32 |
| Ratio of membrane capacity stage (2) compared to stage (1) | 1.53 | 0.66 |
| Ratio of membrane capacity stage (2) compared to stage (3) | 1.48 | 0.66 |
| Ratio retentate pressure to permeate pressure stage (1) | 3.0 | 3.0 |
| Ratio retentate pressure to permeate pressure stage (3) | 13.1 | 13.1 |
| Quotient of pressure ratio over stage (3) over stage (1) | 4.36 | 4.36 |
| Composition stream (8) [$CH_4$ to $CO_2$ each in Vol. %] | 97 to 3 | 97 to 3 |
| Flow rate of stream (8) [$m^3$/h] | 0.462 | 0.455 |
| Composition stream (9) [$CH_4$ to $CO_2$ each in Vol. %] | 7.8 to 92.3 | 13 to 87 |
| Flow rate stream (9) [$m^3$/h] | 0.627 | 0.292 |
| Composition stream (7) [$CH_4$ to $CO_2$ each in Vol. %] | 45.7 to 54.3 | 64.1 to 35.9 |
| Flow rate stream (7) [$m^3$/h] | 1.089 | 0.747 |
| Composition stream (6) [$CH_4$ to $CO_2$ each in Vol. %] | 2.7 to 97.3 | 5.9 to 94.1 |
| Flow rate stream (6) [$m^3$/h] | 0.572 | 0.570 |
| Composition of stream (10) [$CH_4$ to $CO_2$ each in Vol. %] | 40.9 to 59.1 | 99.23 to 0.77 |
| Flow rate of stream (10) [$m^3$/h] | 0.034 | 0.025 |
| Composition of stream (11) [$CH_4$ to $CO_2$ each in Vol. %] | 0.23 to 99.77 | 1.65 to 98.35 |
| Flow rate of stream (11) [$m^3$/h] | 0.538 | 0545 |

The total membrane capacity in Example 7 was 18.6% below that of Comparative Example 7. Thus, the process and apparatus of the invention are applicable at high operating pressures.

Example 8 and Comparative Example 8

Example 8 and Comparative Example 8 show what happens, if the "membrane capacity of stage (2)" is chosen according to the present but the "recycling rate" is one in Example 7 according and in Comparative Example 7 outside of the present invention. The operating temperature in all separation stages was 25° C. In both examples an apparatus according to FIG. 1 was used. The parameters of the simulations are given in Table 13 below:

TABLE 13

| Feature | Example 8 | Com. Ex. 8 |
|---|---|---|
| Crude gas composition [$CH_4$ to $CO_2$ each in Vol. %] | 75 to 25 | 75 to 25 |
| Membrane Selectivity $CO_2/CH_4$ | 45 in all stages | 45 in all stages |
| Operating Pressure [bar] | 17 | 17 |
| Pressurizing device | Compressor | Compressor |
| Flow rate stream (5) at steady state [$m^3$/h] | 1.753 | 1.388 |
| Recycling Rate in sum of streams (9) and (10) | 75 | 39 |
| Ratio of membrane capacity stage (2) compared to stage (1) | 5.1 | 1.65 |
| Ratio of membrane capacity stage (2) compared to stage (3) | 5.1 | 1.65 |
| Ratio retentate pressure to permeate pressure stage (1) | 3.8 | 3.8 |
| Ratio retentate pressure to permeate pressure stage (3) | 4.4 | 4.4 |
| Quotient of pressure ratio over stage (3) over stage (1) | 1.3 | 1.3 |
| Composition stream (8) [$CH_4$ to $CO_2$ each in Vol. %] | 99 to 1 | 99 to 1 |
| Flow rate of stream (8) [$m^3$/h] | 0.756 | 0.747 |
| Composition stream (9) [$CH_4$ to $CO_2$ each in Vol. %] | 19.3 to 80.7 | 33.65 to 66.35 |
| Flow rate stream (9) [$m^3$/h] | 0.718 | 0.342 |
| Composition stream (7) [$CH_4$ to $CO_2$ each in Vol. %] | 60.2 to 39.8 | 78.5 to 21.5 |
| Flow rate stream (7) [$m^3$/h] | 1.474 | 1.089 |
| Composition stream (6) [$CH_4$ to $CO_2$ each in Vol. %] | 5.8 to 94.2 | 17.3 to 82.7 |
| Flow rate stream (6) [$m^3$/h] | 0.279 | 0.299 |
| Composition of stream (10) [$CH_4$ to $CO_2$ each in Vol. %] | 42.3 to 57.7 | 89.8 to 10.2 |
| Flow rate of stream (10) [$m^3$/h] | 0.035 | 0.046 |
| Composition of stream (11) [$CH_4$ to $CO_2$ each in Vol. %] | 0.51 to 99.49 | 4.1 to 95.9 |
| Flow rate of stream (11) [$m^3$/h] | 0.244 | 0.253 |

The total membrane capacity in Example 8 was 21.1% below that of Comparative Example 8. Thus, even if the "membrane capacity of stage (2)" is selected in an inventive manner but the "recycling rate" is not, a significant increase of the total membrane capacity has to be accepted.

This shows the synergistic effects of choosing the "membrane capacities of stage (2)" and of the "recycling rate" both in an inventive manner.

Beside of this, Example 8 shows, that process and apparatus of the invention also works if two very high purity product streams (8) and (11) are desired.

Example 9; Example 10 and Comparative Example 9

In these examples respectively Comparative Example the process and apparatus of the invention were tested with more complex gas mixtures. Again an apparatus according to FIG. 1 was used. The operating temperature in all separation stages was 25° C. The parameters of the simulations are given in Table 14 below:

TABLE 14

| Feature | Example 9 | Example 10 | Com. Ex. 9 |
|---|---|---|---|
| Crude gas composition [$CH_4/CO_2/N_2/O_2$ each in Vol. %] | 61.2/37.6/1.0/0.2 | 61.2/37.6/1.0/0.2 | 61/38/1.0/0.2 |
| Membrane Selectivity $CO_2/CH_4$ | 45 in all stages | 45 in all stages | 45 in all stages |
| Operating Pressure [bar] | 17 | 17 | 17 |
| Pressurizing device | Compressor | Compressor | Compressor |
| Flow rate stream (5) at steady state [$m^3/h$] | 1.749 | 2.552 | 1.379 |
| Recycling Rate in sum of streams (9) and (10) | 75 | 155 | 38 |
| Ratio of membrane capacity stage (2) compared to stage (1) | 3.5 | 6.7 | 1 |
| Ratio of membrane capacity stage (2) compared to stage (3) | 3.2 | 6.6 | 1 |
| Ratio retentate pressure to permeate pressure stage (1) | 3.4 | 2.8 | 5.3 |
| Ratio retentate pressure to permeate pressure stage (3) | 5 | 6.1 | 3.2 |
| Quotient of pressure ratio over stage (3) over stage (1) | 1.47 | 2.2 | 0.6 |
| Composition stream (8) [$CH_4/CO_2/N_2/O_2$ each in Vol. %] | 97.00/1.18/1.58/0.24 | 97.19/0.97/1.59/0.25 | 97.00/1.22/1.58/0.20 |
| Flow rate of stream (8) [$m^3/h$] | 0.629 | 0.629 | 0.628 |
| Composition stream (9) [$CH_4/CO_2/N_2/O_2$ each in Vol. %] | 15.5/83.6/0.4/0.5 | 8.8/90.6/0.2/0.4 | 38.6/59.6/0.95/0.85 |
| Flow rate stream (9) [$m^3/h$] | 0.713 | 1.529 | 0.204 |
| Composition stream (7) [$CH_4/CO_2/N_2/O_2$ each in Vol. %] | 53.7/45/0.9/0.4 | 34.6/64.5/0.6/0.3 | 82.7/15.5/1.4/0.4 |
| Flow rate stream (7) [$m^3/h$] | 1.343 | 2.158 | 0.832 |
| Composition stream (6) [$CH_4/CO_2/N_2/O_2$ each in Vol. %] | 4.3/95.3/0.1/0.3 | 2.1/97.7/0.05/0.15 | 10.9/88.4/0.3/0.4 |
| Flow rate stream (6) [$m^3/h$] | 0.406 | 0.394 | 0.548 |
| Composition of stream (10) [$CH_4/CO_2/N_2/O_2$ each in Vol. %] | 45.4/52.2/1.1/1.3 | 33.4/64.45/0.85/1.3 | 32.2/66.2/0.8/0.8 |
| Flow rate of stream (10) [$m^3/h$] | 0.035 | 0.023 | 0.176 |
| Composition of stream (11) [$CH_4/CO_2/N_2/O_2$ each in Vol. %] | 0.42/99.42/0.02/0.14 | 0.20/99.70/0.01/0.09 | 0.81/98.96/0.03/0.20 |
| Flow rate of stream (11) [$m^3/h$] | 0.371 | 0.371 | 0.372 |

The total membrane capacity in Example 9 was 19.4% below that of Comparative Example 9 and that of Example 10 was 9.4% below that of Comparative Example 9. This shows that process and apparatus of the invention are also beneficial if more complex gas mixtures have to be separated.

Conclusion to Example 1 to 10

In Examples 1 to 10 different parameters were changed compared and directly compared to corresponding comparative examples. It could be shown, that process and apparatus of the invention are applicable for a wide range of operating pressures, membrane selectivities and for different gas mixtures. It was also demonstrated that the inventive combination of "recycling rates", "increased membrane capacity in stage (2)" and "quotient of pressure ratio of stage (3) over pressure ratio of stage (1)", in all cases led to a saving of overall membrane capacity compared to the corresponding comparative examples. A saving in total membrane capacity correlates to savings in invest and maintenance costs and is very lucrative for applications in regions where energy is cheap and invest respectively maintenance costs are decisive.

Examples 11 and 12

In Example 11 membranes with different selectivities were used in different separation stages. In Example 12 the process parameters are very similar to Example 11, however, membranes with identical selectivities were used in all three stages. In both examples an apparatus according to FIG. 1 was used. The parameters of the simulations are given in Table 15 below:

TABLE 15

| Feature | Example 11 | Example 12 |
|---|---|---|
| Crude gas composition [$CH_4$ to $CO_2$ each in Vol. %] | 50 to 50 | 50 to 50 |
| Membrane Selectivity $CO_2/CH_4$ | 45 in stage (1) | 45 in all stages |
|  | 20 in stage (2) |  |
|  | 20 in stage (3) |  |
| Operating Pressure [bar] | 18.2 | 18.2 |
| Pressurizing device | Compressor | Compressor |
| Flow rate stream (5) at steady state [$m^3/h$] | 1.881 | 1.707 |
| Recycling Rate in sum of streams (9) and (10) | 88 | 71 |
| Ratio of membrane capacity stage (2) compared to stage (1) | 2.2 | 2.4 |
| Ratio of membrane capacity stage (2) compared to stage (3) | 2.1 | 2.2 |
| Ratio retentate pressure to permeate pressure stage (1) | 3.1 | 3.1 |
| Ratio retentate pressure to permeate pressure stage (3) | 5.8 | 5.9 |
| Quotient of pressure ratio over stage (3) over stage (1) | 1.9 | 1.9 |
| Composition stream (8) [$CH_4$ to $CO_2$ each in Vol. %] | 98.5 to 1.5 | 98.5 to 1.5 |
| Flow rate of stream (8) [$m^3/h$] | 0.504 | 0.506 |
| Composition stream (9) [$CH_4$ to $CO_2$ each in Vol. %] | 21 to 79 | 12.7 to 87.3 |
| Flow rate stream (9) [$m^3/h$] | 0.843 | 0.665 |
| Composition stream (7) [$CH_4$ to $CO_2$ each in Vol. %] | 50 to 50 | 49.8 to 50.2 |
| Flow rate stream (7) [$m^3/h$] | 1.347 | 1.171 |
| Composition stream (6) [$CH_4$ to $CO_2$ each in Vol. %] | 3.5 to 96.5 | 3.3 to 96.7 |
| Flow rate stream (6) [$m^3/h$] | 0.534 | 0.536 |
| Composition of stream (10) [$CH_4$ to $CO_2$ each in Vol. %] | 40 to 60 | 38.3 to 61.7 |
| Flow rate of stream (10) [$m^3/h$] | 0.038 | 0.042 |
| Composition of stream (11) [$CH_4$ to $CO_2$ each in Vol. %] | 0.68 to 99.32 | 0.29 to 99.71 |
| Flow rate of stream (11) [$m^3/h$] | 0.496 | 0.494 |

Comparison of Example 11 and Example 12 reveals that the inventive process and apparatus is applicable with membranes with different selectivities in different separation stages but also with membranes with identical selectivities in all separation stages.

LIST OF REFERENCE NUMERALS

1: Feed stream separation stage
2: Retentate separation stage
3: Permeate separation stage 3
4: One-stage or multistage compressor
5: Feed stream
6: First permeate stream
7: First retentate stream
8: Second retentate stream
9: Second permeate stream
10: Third retentate stream
11: Third permeate stream
12: Optional pressure-reducing valve in the first retentate stream 7
13: Optional pressure-reducing valve in the second retentate stream 8
14: Optional pressure-reducing valve in the third retentate stream 10
15: Vacuum device (not reproduced in the FIGS.
16: Mixing chamber (not reproduced in the FIGS.
17: Crude gas stream

The invention claimed is:

1. A method for separating gases from a crude gas stream comprising at least two components, wherein in an apparatus comprising a feed stream separation stage, a retentate separation stage and a permeate separation stage, each stage being a membrane separation stage with gas separation membranes, a) a feed stream is separated in the feed stream separation stage into a first permeate stream and a first retentate stream,
b) the first retentate stream is separated in the retentate separation stage into a second permeate stream and a second retentate stream,
c) the first permeate stream is separated in the permeate separation stage into a third retentate stream and a third permeate stream,
d) the second retentate stream is removed as a first product,
e) the third permeate stream is removed as a second product, and
f) the second permeate stream and the third retentate stream are combined with the crude gas stream to give the feed stream, and wherein
i) the combined gas volume of the second permeate stream and the third retentate stream is from 60 to 100% of the volume of the crude gas stream,
ii) the total capacity of the gas separation membranes in the retentate separation stage is higher than the total capacity of the gas separation membranes in the feed stream separation stage, the total capacity being measured for nitrogen Grade 4.8 under standard conditions as defined in the description, and
iii) the quotient of the pressure ratio over the permeate separation stage to the pressure ratio over the feed stream separation stage is in a range of from 0.5 to 8.

2. The method of claim 1, wherein the apparatus comprises a compressor arranged up-stream of the feed stream separation stage.

3. The method of claim 1, wherein the apparatus comprises at least one vacuum device arranged in at least one permeate stream of the feed stream separation stage, the retentate separation stage and/or the permeate separation stage.

4. The method of claim 1, wherein the first permeate stream is not subjected to a recompression.

5. The method of claim 1, wherein the ratio of the total capacity of the gas separation membranes in the retentate separation stage to the total capacity of the gas separation membranes in the feed stream separation stage is in a range of from 1.05 to 10.

6. The method of claim 5, wherein the ratio of the total capacity of the gas separation membranes in the retentate separation stage to the total capacity of the gas separation membranes in the feed stream separation stage is in a range of from 1.5 to 6.

7. The method of claim 1, wherein the ratio of the total capacity of the gas separation membranes in the permeate separation stage to the total capacity of the gas separation membranes in the feed stream separation stage is in a range of from 0.5 to 3.

8. The method of claim 7, wherein the ratio of the total capacity of the gas separation membranes in the permeate separation stage to the total capacity of the gas separation membranes in the feed stream separation stage is in a range of from 0.8 to 1.

9. The method of claim 1, wherein the combined gas volume recycled with the second permeate stream and the third retentate stream is from 65 to 85% of the volume of the crude gas stream.

10. The method of claim 1, wherein the quotient of the pressure ratio over the permeate separation stage to the pressure ratio over the feed stream separation stage is in a range of from 1 to 3.

11. The method of claim 1, wherein the gas separation membranes in the feed stream separation stage have a pure gas selectivity for $CO_2/CH_4$ of at least 10.

12. The method of claim 11, wherein the gas separation membranes in the feed stream separation stage have a pure gas selectivity for $CO_2/CH_4$ of from 20 to 100.

13. The method of claim 1, wherein the gas separation membranes comprise a separation-active layer of a material selected from the group consisting of polyamides, polyetherimides, polyaramides, polybenzoxazoles, polybenzothiazoles, polybenzimidazoles, polysulfones, cellulose acetate, cellulose acetate derivatives, polyphenylene oxides, polysiloxanes, polymers with intrinsic microporosity, mixed matrix membranes, facilitated transport membranes, polyethylene oxides, polypropylene oxides and polyimides.

14. The method of claim 13, wherein the gas separation membranes comprise a separation-active layer of a polyimide consisting of monomer units A and B with $0 \leq x \leq 0.5$ and $1 \geq y \geq 0.5$, wherein each R is an identical or different radical selected from the group consisting of radicals L1, L2, L3 and L4

(L1)

(L2)

(L3)

(L4)

15. The method of claim 13, wherein the gas separation membranes comprise a separation-active layer of a polyimide selected from the group of polyimides with CAS number 9046-51-9 and polyimides with CAS number 134119-41-8.

16. The method of claim 2, wherein the second permeate stream and the third retentate stream are combined with the crude gas stream on the suction side of the compressor.

17. The method of claim 2, wherein the compressor is a multistage compressor and the second permeate stream, the third retentate stream, or both are introduced into the compressor between two compression stages.

18. The method of claim 1, wherein the gas separation membranes are hollow fiber membranes.

19. The method of claim 1, wherein the retentate pressure of the feed stream separation stage and of the retentate separation stage are adjusted with a pressure reducing valve in the second retentate stream to a value of from 1 to 100 bar.

20. The method of claim 19, wherein the retentate pressure of the feed stream separation stage and of the retentate separation stage are adjusted to a value of from 10 to 70 bar.

21. The method of claim 1, wherein the pressure on the permeate side of the feed stream separation stage is adjusted with a pressure reducing valve on the retentate side of the permeate separation stage to a value of from 1 to 30 bar.

22. The method of claim 19, wherein the pressure on the permeate side of the feed stream separation stage is adjusted to a value of from 2 to 10 bar.

23. The method of claim 1, wherein the crude gas stream is selected from the group consisting of biogas, natural gas, air, a gas mixture comprising carbon dioxide and methane, a gas mixture comprising hydrogen and methane, a gas mixture comprising carbon monoxide and methane, a gas mixture comprising helium and methan, a gas mixture comprising helium and nitrogen, a gas mixture comprising hydrogen and carbon monoxide, a gas mixture comprising a permanent gas having a boiling point of less than 110 Kelvin at 1 atm and a non permanent gas having a boiling point above or equal to 110 Kelvin at 1 atm, a gas mixture comprising carbon dioxide and a hydrocarbon, and a gas mixture comprising nitrogen and a hydrocarbon.

\* \* \* \* \*

(12) INTER PARTES REVIEW CERTIFICATE (4255th)
United States Patent
Priske

(10) Number: US 10,471,380 K1
(45) Certificate Issued: Jan. 27, 2026

(54) PROCESS FOR SEPARATION OF GASES WITH REDUCED MAINTENANCE COSTS

(71) Applicant: Markus Priske

(72) Inventor: Markus Priske

(73) Assignee: EVONIK OPERATIONS GMBH

Trial Number:

IPR2024-00611 filed Feb. 23, 2024

Inter Partes Review Certificate for:

Patent No.: 10,471,380
Issued: Nov. 12, 2019
Appl. No.: 15/540,709
Filed: Jun. 29, 2017

The results of IPR2024-00611 are reflected in this inter partes review certificate under 35 U.S.C. 318(b).

INTER PARTES REVIEW CERTIFICATE
U.S. Patent 10,471,380 K1
Trial No. IPR2024-00611
Certificate Issued Jan. 27, 2026

AS A RESULT OF THE INTER PARTES REVIEW PROCEEDING, IT HAS BEEN DETERMINED THAT:

Claims 1-23 are found patentable.

\* \* \* \* \*